N. H. FAY.
FEEDING BLANKS TO RACK CUTTING MACHINES.
APPLICATION FILED JULY 8, 1910.

1,001,008.

Patented Aug. 22, 1911.

Witnesses:
Percy M. Andrews
Eleanor W. Dennis

Inventor:
Norman H. Fay
by S. W. Bates
Atty.

UNITED STATES PATENT OFFICE.

NORMAN H. FAY, OF DEXTER, MAINE, ASSIGNOR TO FAY & SCOTT, OF DEXTER, MAINE, A CORPORATION OF MAINE.

FEEDING BLANKS TO RACK-CUTTING MACHINES.

1,001,008. Specification of Letters Patent. Patented Aug. 22, 1911.

Application filed July 8, 1910. Serial No. 570,970.

*To all whom it may concern:*

Be it known that I, NORMAN H. FAY, a citizen of the United States of America, and a resident of Dexter, in the county of Penobscot, State of Maine, have invented certain new and useful Improvements in Feeding Blanks to Rack-Cutting Machines, of which the following is a specification.

My invention relates to means for feeding racks through a rack cutting machine and it is directed to providing simple mechanism by which racks of any length may be fed through the machine.

According to my invention, I provide a tooth cutter for cutting the teeth and a feeding device adapted to engage the finished teeth and to feed the rack forward one tooth or a part of a tooth at a time. The blanks are temporarily secured end to end to form a series of blanks, and a limited number of teeth are formed on the forward end of the series to start the operation. The racks are then fed through the machine by the action of the feeding device engaging the teeth as they are cut. The sections are removed as fast as cut and new blanks are added on at the rear. To start the operation, I prefer to make use of a templet having a series of feed teeth or recesses to correspond with the regular teeth of the rack. In this way I am enabled by very simple mechanism to make use of the rack teeth as fast as they are formed, each rack section as it passes through forming a templet for feeding the succeeding sections.

In the accompanying drawing, I have illustrated simple means for carrying out my invention only those parts of the mechanism being shown that are necessary to understand the invention.

Figure 1:
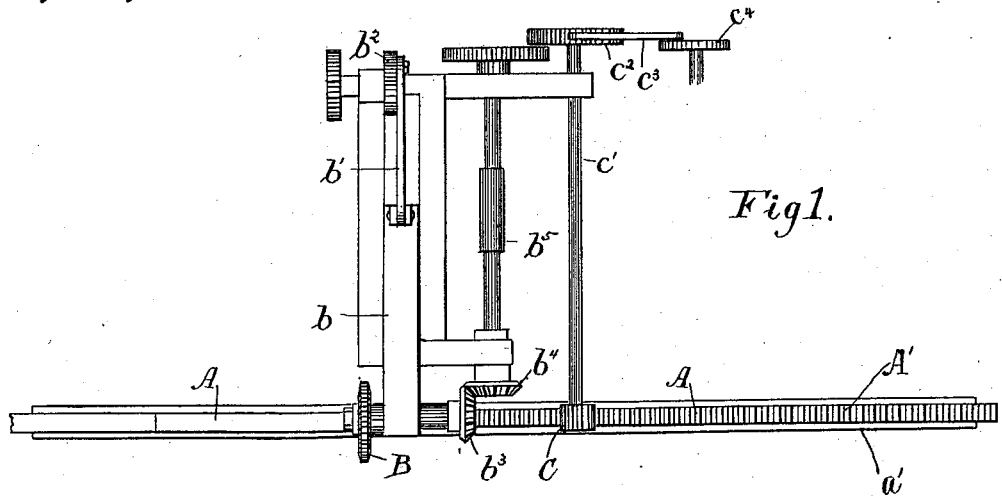
Figure 2:
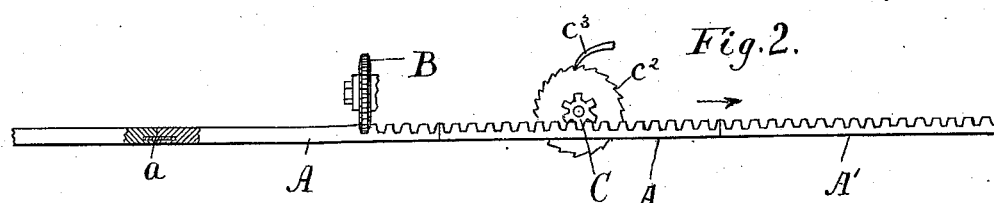
Figure 3:
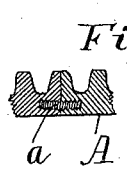

In the drawing, Figure 1 is a plan, Fig. 2 is an elevation, and Fig. 3 is a longitudinal section through the abutting ends of two adjacent racks.

A, A, represent a series of racks, a portion cut and a portion uncut blanks. The end bar A' of the series is preferably formed as a permanent templet to be used in starting the operation. It is temporarily secured to the next rack behind and the rack blanks are secured to each other end to end by nipples as $a$ or in any other suitable manner.

B represents a suitable cutter here shown as a rotary cutter with a cutting action transverse to the length of the blanks. Means are used for reciprocating the cutter B across the blank to cut the individual teeth. As here shown the cutter B is on an arbor with the miter gear $b^3$ which engages another miter gear $b^4$ on a longitudinally expansible shaft $b^5$. Rotation is applied to the shaft $b^5$ by any suitable means not shown. The cutter is reciprocated by a moving slide $b$ operated by a pitman $b'$ connected with a crank disk $b^2$. The series of racks are drawn through the machine by an intermittently acting feeding device adapted to engage the teeth as fast as they are cut. As here shown, the pinion C is secured to a shaft $c'$ having on one end a ratchet wheel $c^2$ operated intermittently by a pawl $c^3$ connected with a crank disk $c^4$. The pawl $c^3$ is timed to turn the ratchet wheel $c^2$ after each tooth is cut so that the pinion will feed along a suitable distance. Suitable guides $a'$ are provided to hold the racks in place while they are feeding through the machine. After the operation is started by the templet, the blanks are screwed on one after another at the rear and unscrewed and removed as fast as the teeth are cut. Thus blanks of any length may be cut, each rack as cut being used as a templet to feed in the following blanks into the machine. The racks may be formed of solid bars as here shown or they may be formed from rough castings as desired and a plurality of blanks may be placed side by side if desired, all being cut at once. The operation is continuous, the racks being fed through the machine indefinitely.

It is obvious that a completely organized machine for feeding and cutting racks may vary as to details, from the simple mechanism shown by way of illustration.

It is to be understood that other means than those herein shown may be employed to actuate the cutting tool and the feeding mechanism.

I claim:—

1. The continuous process of feeding rack blanks through a blank cutting machine consisting of temporarily securing the blanks together end to end to form a series of blanks, forming teeth on the forward end of the series, feeding the series of blanks through the machine by a feeding device engaging teeth as they are cut, removing the racks as fast as cut and adding on other blanks at the rear end.

2. The process of feeding a rack cutting and feeding machine which consists in inserting a templet into said machine, attaching blanks to be cut in series to said templet and removing said templet forming teeth in the forward end of the series and each blank as they issue from the machine.

3. The process of feeding a rack cutting and feeding machine which consists in inserting a templet into said machine, attaching blanks in series to said templet by means within the area of said templet and blanks forming teeth in the forward end of the series, and segregating said templet and each blank from the following blank as they issue from the machine.

In witness whereof I have hereunto set my hand this 29th day of June, 1910.

NORMAN H. FAY.

Witnesses:
F. D. DEARTH,
W. B. GOULD.

Copies of this patent may be obtained for five cents each, by addressing the "Commissioner of Patents, Washington, D. C."